(12) United States Patent
Prest et al.

(10) Patent No.: US 9,221,289 B2
(45) Date of Patent: Dec. 29, 2015

(54) SAPPHIRE WINDOW

(75) Inventors: Christopher D. Prest, San Francisco, CA (US); Ashutosh Y. Shukla, Santa Clara, CA (US); Dale N. Memering, San Francisco, CA (US); Vashist Vasanthakumar, San Francisco, CA (US); Vincent Yan, San Francisco, CA (US); Thomas Johannessen, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 13/560,791

(22) Filed: Jul. 27, 2012

(65) Prior Publication Data

US 2014/0030443 A1    Jan. 30, 2014

(51) Int. Cl.
*G02B 1/00* (2006.01)
*B41M 5/24* (2006.01)
*G02B 1/10* (2015.01)

(52) U.S. Cl.
CPC .. *B41M 5/24* (2013.01); *G02B 1/00* (2013.01); *G02B 1/10* (2013.01)

(58) Field of Classification Search
CPC .............. B05D 5/06; B05D 5/00; B05D 7/00; B41M 5/24; G02B 1/00; G02B 1/10; C30B 29/20
USPC ........................................................ 427/162
See application file for complete search history.

(56) References Cited

U.S. PATENT DOCUMENTS

| | | | |
|---|---|---|---|
| 2,248,955 A | 7/1941 | Capps | |
| 2,854,794 A | 10/1958 | Luedeman | |
| 3,753,775 A | 8/1973 | Robinson et al. | |
| 3,964,942 A | 6/1976 | Berkenblit et al. | |
| 4,008,111 A | 2/1977 | Rutz | |
| 4,054,895 A | 10/1977 | Ham | |
| 4,070,211 A | 1/1978 | Harari | |
| 4,085,302 A | 4/1978 | Zenk et al. | |
| 4,339,300 A | 7/1982 | Noble | |
| 4,393,578 A | 7/1983 | Cady et al. | |
| 4,662,124 A | 5/1987 | Kato et al. | |
| 4,732,867 A | 3/1988 | Schnable | |
| 4,735,917 A | 4/1988 | Flatley et al. | |
| 4,775,641 A | 10/1988 | Duffy et al. | |

(Continued)

FOREIGN PATENT DOCUMENTS

| | | |
|---|---|---|
| DE | 202008002512 U1 | 6/2008 |
| EP | 0305626 | 3/1989 |

(Continued)

OTHER PUBLICATIONS

Schmid et al., "Effect of Crystal Orientation and Temperature on the Strength of Sapphire," J.Am.Ceram.Soc., 81, 1998, pp. 885-893.

(Continued)

*Primary Examiner* — Elizabeth Burkhart
(74) *Attorney, Agent, or Firm* — Brownstein Hyatt Farber Schreck, LLP

(57) ABSTRACT

Methods for creating sapphire windows are provided herein. In particular, one embodiment may take the form of a method of manufacturing sapphire windows. The method includes obtaining a polished sapphire wafer and applying decoration to the sapphire wafer. The method also includes cutting the sapphire wafer into discrete windows. In some embodiments, the cutting step comprises laser ablation of the sapphire.

21 Claims, 15 Drawing Sheets

(56) References Cited

U.S. PATENT DOCUMENTS

| | | |
|---|---|---|
| 4,811,004 A | 3/1989 | Person et al. |
| 4,826,300 A | 5/1989 | Efron et al. |
| 4,849,299 A | 7/1989 | Loth |
| 4,908,074 A | 3/1990 | Hosoi et al. |
| 4,946,546 A | 8/1990 | Bourgeois |
| 5,151,389 A | 9/1992 | Zappella |
| 5,154,023 A | 10/1992 | Sioshansi |
| 5,377,669 A | 1/1995 | Schulz |
| 5,413,360 A | 5/1995 | Atari et al. |
| 5,427,051 A | 6/1995 | Maxwell et al. |
| 5,441,591 A | 8/1995 | Imthurn et al. |
| 5,451,553 A | 9/1995 | Scott et al. |
| 5,543,630 A | 8/1996 | Bliss et al. |
| 5,549,746 A | 8/1996 | Scott et al. |
| 5,627,109 A | 5/1997 | Sassa et al. |
| 5,661,313 A | 8/1997 | Dubbelday et al. |
| 5,697,998 A | 12/1997 | Platus et al. |
| 5,702,654 A | 12/1997 | Chen et al. |
| 5,804,522 A | 9/1998 | Uegami |
| 5,852,622 A | 12/1998 | Meissner et al. |
| 5,877,094 A | 3/1999 | Egley et al. |
| 6,025,060 A | 2/2000 | Meissner et al. |
| 6,028,711 A | 2/2000 | Adachi |
| 6,028,762 A | 2/2000 | Kamitani |
| 6,030,849 A | 2/2000 | Hasegawa et al. |
| 6,038,079 A | 3/2000 | Michaels |
| 6,123,026 A | 9/2000 | Gottlieb |
| 6,265,089 B1 | 7/2001 | Fatemi et al. |
| 6,379,985 B1 | 4/2002 | Cervantes et al. |
| 6,406,769 B1 | 6/2002 | Delabre |
| 6,424,017 B2 | 7/2002 | Kurtz et al. |
| 6,483,237 B2 | 11/2002 | Eastlund et al. |
| 6,489,221 B2 | 12/2002 | Gehrke et al. |
| 6,547,722 B1 | 4/2003 | Higuma |
| 6,586,819 B2 | 7/2003 | Matsuoka |
| 6,775,073 B2 | 8/2004 | Kamo |
| 6,818,532 B2 | 11/2004 | Yeom et al. |
| 6,819,693 B2 | 11/2004 | Kinoshita et al. |
| 6,849,524 B2 | 2/2005 | Shelton et al. |
| 6,852,253 B2 | 2/2005 | Tomioka |
| 6,858,274 B2 | 2/2005 | Fukazawa |
| 6,872,108 B2 | 3/2005 | Hsu |
| 6,875,099 B2 | 4/2005 | Stepanovich |
| 6,911,375 B2 | 6/2005 | Guarini et al. |
| 7,018,709 B2 | 3/2006 | Stevenson et al. |
| 7,030,417 B2 | 4/2006 | Ishibashi et al. |
| 7,074,652 B2 | 7/2006 | Yoon et al. |
| 7,128,846 B2 | 10/2006 | Nishijima et al. |
| 7,151,045 B2 | 12/2006 | Kim et al. |
| 7,171,290 B2 | 1/2007 | Morinaga et al. |
| 7,208,096 B2 | 4/2007 | Akkipeddi et al. |
| 7,255,740 B2 | 8/2007 | Sprenger et al. |
| 7,390,702 B2 | 6/2008 | Nakamura |
| 7,495,615 B2 | 2/2009 | Yamanaka et al. |
| 7,499,093 B2 | 3/2009 | Campbell |
| 7,561,351 B2 | 7/2009 | Konno |
| 7,616,951 B2 | 11/2009 | Chang et al. |
| 7,619,567 B2 | 11/2009 | Lynch et al. |
| 7,663,189 B2 | 2/2010 | Fukuda |
| 7,683,838 B2 | 3/2010 | Koyama et al. |
| 7,704,321 B2 | 4/2010 | Riman et al. |
| 7,803,451 B2 | 9/2010 | Lee et al. |
| 7,807,549 B2 | 10/2010 | Tong et al. |
| 7,883,557 B2 | 2/2011 | Liu et al. |
| 7,902,474 B2 | 3/2011 | Mittleman et al. |
| 7,943,953 B2 | 5/2011 | Sakamoto et al. |
| 7,956,356 B2 | 6/2011 | Tanikella et al. |
| 7,966,785 B2 | 6/2011 | Zadesky et al. |
| 7,977,587 B2 | 7/2011 | Rajagopal et al. |
| 8,003,189 B2 | 8/2011 | Jones et al. |
| 8,157,912 B2 | 4/2012 | Wei |
| 8,158,900 B2 | 4/2012 | Maatta |
| 8,197,303 B2 | 6/2012 | Tanikella et al. |
| 8,268,656 B2 | 9/2012 | Kajiyama |
| 8,390,023 B2 | 3/2013 | Armitage et al. |
| 8,455,879 B2 | 6/2013 | Tanikella et al. |
| 8,721,917 B2 | 5/2014 | Cherian et al. |
| 2002/0017653 A1 | 2/2002 | Chuang |
| 2002/0149735 A1* | 10/2002 | Umehara et al. ............... 349/158 |
| 2002/0167068 A1 | 11/2002 | Hsu et al. |
| 2002/0168837 A1 | 11/2002 | Hsu et al. |
| 2006/0003587 A1 | 1/2006 | Hsu et al. |
| 2006/0043396 A1 | 3/2006 | Tsuda et al. |
| 2006/0162849 A1 | 7/2006 | Han |
| 2006/0196849 A1 | 9/2006 | Moeggenborg et al. |
| 2007/0204493 A1 | 9/2007 | Foley et al. |
| 2008/0075941 A1 | 3/2008 | Tatartchenko et al. |
| 2008/0145632 A1* | 6/2008 | Nagami ........................ 428/220 |
| 2008/0264767 A1 | 10/2008 | Chen et al. |
| 2009/0098807 A1 | 4/2009 | Bakshi et al. |
| 2009/0104409 A1 | 4/2009 | Derriey et al. |
| 2009/0130415 A1 | 5/2009 | Mack, III et al. |
| 2009/0268019 A1 | 10/2009 | Ishii |
| 2009/0321234 A1 | 12/2009 | Yu et al. |
| 2010/0092728 A1 | 4/2010 | Hasegawa et al. |
| 2011/0019354 A1* | 1/2011 | Prest et al. ............... 361/679.21 |
| 2011/0062394 A1 | 3/2011 | Kumaran et al. |
| 2011/0177300 A1* | 7/2011 | Hankey et al. ................. 428/189 |
| 2011/0195560 A1 | 8/2011 | Gaudin et al. |
| 2011/0223840 A1 | 9/2011 | Morinaga et al. |
| 2012/0038471 A1 | 2/2012 | Kim et al. |
| 2012/0088099 A1 | 4/2012 | Tosatti et al. |
| 2012/0118228 A1* | 5/2012 | Lee et al. ...................... 117/217 |
| 2012/0135177 A1* | 5/2012 | Cornejo et al. ................. 428/43 |
| 2012/0212890 A1 | 8/2012 | Hoshino et al. |
| 2012/0229424 A1* | 9/2012 | Behles et al. .................. 345/177 |
| 2013/0102359 A1 | 4/2013 | Ho |
| 2013/0237402 A1* | 9/2013 | Wang et al. .................... 501/86 |

FOREIGN PATENT DOCUMENTS

| | | |
|---|---|---|
| EP | 1013802 | 6/2000 |
| EP | 1829846 | 9/2007 |
| GB | 1135886 | 12/1968 |
| JP | 54032062 | 3/1979 |
| JP | 1173764 | 7/1989 |
| JP | 2039578 | 2/1990 |
| JP | 3021048 | 1/1991 |
| JP | 03115200 | 5/1991 |
| JP | 3177335 | 8/1991 |
| JP | 3250659 | 11/1991 |
| JP | 5027257 | 2/1993 |
| JP | 5085894 | 4/1993 |
| JP | 5313103 | 11/1993 |
| JP | 5333164 | 12/1993 |
| JP | 5335435 | 12/1993 |
| JP | 06242260 | 9/1994 |
| JP | 6314694 | 11/1994 |
| JP | 06337292 | 12/1994 |
| JP | 7129952 | 5/1995 |
| JP | 07145000 | 6/1995 |
| JP | 8040797 | 2/1996 |
| JP | 8148594 | 6/1996 |
| JP | 09008690 | 1/1997 |
| JP | 9213773 | 8/1997 |
| JP | 9270565 | 10/1997 |
| JP | 9295895 | 11/1997 |
| JP | 10239520 | 9/1998 |
| JP | 10269543 | 10/1998 |
| JP | 10275955 | 10/1998 |
| JP | 10335259 | 12/1998 |
| JP | 11135889 | 5/1999 |
| JP | 2000183203 | 6/2000 |
| JP | 2000196149 | 7/2000 |
| JP | 2001134927 | 5/2001 |
| JP | 2001176993 | 6/2001 |
| JP | 2001237335 | 8/2001 |
| JP | 2001298170 | 10/2001 |
| JP | 2002015977 | 1/2002 |
| JP | 2002109854 | 4/2002 |
| JP | 2002184845 | 6/2002 |
| JP | 2002201096 | 7/2002 |
| JP | 2002255694 | 9/2002 |
| JP | 2002289529 | 10/2002 |

(56) References Cited

FOREIGN PATENT DOCUMENTS

| | | |
|---|---|---|
| JP | 2002293692 | 10/2002 |
| JP | 2003015156 | 1/2003 |
| JP | 2003069176 | 3/2003 |
| JP | 2003133802 | 5/2003 |
| JP | 2003137690 | 5/2003 |
| JP | 2003245847 | 9/2003 |
| JP | 2003277194 | 10/2003 |
| JP | 2003282551 | 10/2003 |
| JP | 2003332234 | 11/2003 |
| JP | 2004111848 | 4/2004 |
| JP | 2004168622 | 6/2004 |
| JP | 2004288934 | 10/2004 |
| JP | 2004296575 | 10/2004 |
| JP | 2004296701 | 10/2004 |
| JP | 2004296912 | 10/2004 |
| JP | 2005047718 | 2/2005 |
| JP | 2005064492 | 3/2005 |
| JP | 2005079171 | 3/2005 |
| JP | 2005085888 | 3/2005 |
| JP | 2005101230 | 4/2005 |
| JP | 2005104742 | 4/2005 |
| JP | 2005136106 | 5/2005 |
| JP | 2005277334 | 10/2005 |
| JP | 2005285869 | 10/2005 |
| JP | 2005314121 | 11/2005 |
| JP | 2006016230 | 1/2006 |
| JP | 2006016239 | 1/2006 |
| JP | 2006062931 | 3/2006 |
| JP | 2006066442 | 3/2006 |
| JP | 2006232639 | 9/2006 |
| JP | 2006232640 | 9/2006 |
| JP | 2006339308 | 12/2006 |
| JP | 2007150072 | 6/2007 |
| JP | 2007237627 | 9/2007 |
| JP | 2007237628 | 9/2007 |
| JP | 2007269577 | 10/2007 |
| JP | 2008111984 | 5/2008 |
| JP | 2008211040 | 9/2008 |
| JP | 2008297150 | 12/2008 |
| JP | 2009263534 | 11/2009 |
| JP | 2010056485 | 3/2010 |
| KR | 20100090897 | 8/2010 |
| WO | WO98/56575 | 12/1998 |
| WO | WO02/054718 | 7/2002 |
| WO | WO2004/059731 | 7/2004 |
| WO | WO2007/143480 | 12/2007 |
| WO | WO2008/036888 | 3/2008 |
| WO | WO2008/122296 | 10/2008 |
| WO | WO2009/025842 | 2/2009 |
| WO | WO2009/151160 | 12/2009 |
| WO | WO2010/057842 | 2/2010 |

OTHER PUBLICATIONS

Quick, Darren, "Aston Martin teams with Mobiado for transparent touchscreen concept phone," Mar. 28, 2011, pp. 1-5, retrieved from the internet: URL:http://www-gizmag.com/cpt002-aston-martin-concept-phone/18248.
Zahler, James, "Sapphire and GaN Substrate Materials," DOE SSL Manufacturing R&D Workshop 2012, Presentation, Apr. 14, 2012, pp. 1-19.
Flores, Marc, "Can a Case Scratch the iPhone 4's Glass and Shatter it?," Oct. 8, 2010, pp. 1-10, retrieved from the internet: URL:http://www.intomobile.com/2010/10/08/glassgate-iphone-4.
Sykes, Neil, "The Use of Lasers in Target Manufacture," 2010, pp. 1-24, retrieved from the internet: URL:heep://www.stfc.ac.uk/CLF/resources/PDF/events_3effw_weds_sykes.pdf.
International Search Report and Written Opinion, PCT Application No. PCT/US2013/0049444, 24 pages, Feb. 28, 2014.
International Search Report and Written Opinion, PCT Application No. PCT/US2014/0010145, 11 pages, Apr. 4, 2014.

* cited by examiner

US 9,221,289 B2

SAPPHIRE WINDOW

TECHNICAL FIELD

The present application generally relates to camera windows and more particularly relates to sapphire camera windows.

BACKGROUND

Mobile electronic devices are ubiquitous in today's society. From cell phones to tablet computers, they can be found in pockets, purses, and briefcases, and are used in both personal and business settings. Generally, the devices include a visual display output. In some cases, display may perform double-duty by providing the visual output and receiving touch input. Often, these devices also include cameras and other input devices. Both the display screens and camera covers are typically made of glass.

In processing the glass for use as a camera cover or a display screen, a large sheet of glass is initially cut into squares by a scribe and break process before each of the cut squares are ground into a desired shape. Chamfers may be added to the individual glass pieces and a chemical strengthening process may be performed to help fortify the glass pieces. Subsequently, each individual glass piece is lapped, polished and decorated to finally produce the glass cover or screen. The process is lengthy and includes many steps, most of which are performed on an individual basis rather than in a batch. Despite all the processing, the glass remains susceptible to damage and scratches, chips and cracks in the glass diminish the ability of the device to perform its intended purposes.

SUMMARY

One embodiment may take the form of a method of manufacturing sapphire windows. The method includes obtaining a polished sapphire wafer and applying decoration to the sapphire wafer. The method also includes cutting the sapphire wafer into discrete windows. In some embodiments, the cutting step comprises laser ablation of the sapphire.

Another embodiment may take the form of a method of manufacturing sapphire windows that includes growing a sapphire boule, coring the sapphire boule to form a sapphire core and slicing the sapphire core into wafers. Additionally, the method includes lapping the sapphire wafers, polishing the sapphire wafers for provide polished sapphire wafers and dicing the sapphire wafer into discrete windows using a laser. The method also includes applying an ink mask to the discrete windows.

Yet another embodiment may take the form of a method of manufacturing sapphire windows that includes extruding a sapphire member and grinding an edge of the sapphire member. Additionally, the method includes slicing the sapphire member using a laser to form windows and polishing the windows.

While multiple embodiments are disclosed, still other embodiments of the present invention will become apparent to those skilled in the art from the following Detailed Description. As will be realized, the embodiments are capable of modifications in various aspects, all without departing from the spirit and scope of the embodiments. Accordingly, the drawings and detailed description are to be regarded as illustrative in nature and not restrictive.

DETAILED DESCRIPTION

Figure 1A:
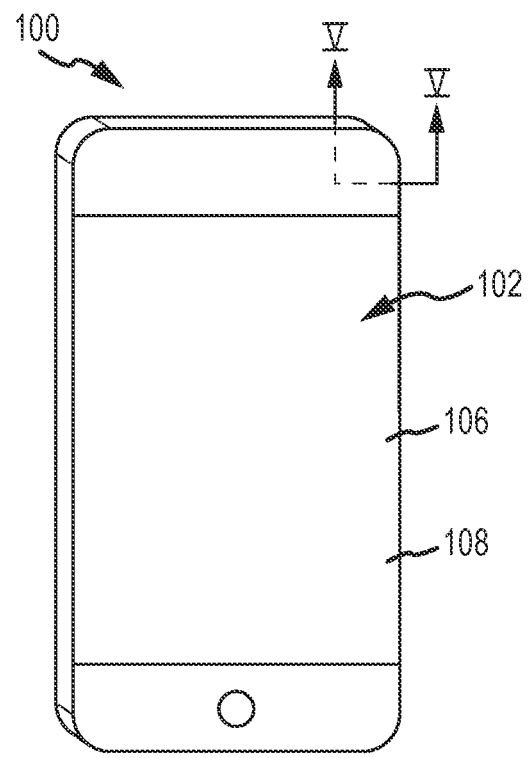
FIG. 1A illustrates a front side of an example electronic device having a sapphire cover.

Conventionally, sapphire has not been a viable alternative for glass or plastic surfaces of electronic devices. This is due in part to the cost of obtaining and difficulty of processing the sapphire. In particular, sapphire is relatively rare and expensive. Additionally, due to the hardness of the sapphire, conventional processes may not be effective or may result in faster wearing of tools and significantly increased processing times. Methods for creating sapphire windows are described herein that achieve processing efficiencies to, in part, make the replacement of glass or plastic members of electronic devices feasible, whereas previously such replacement would be at least cost prohibitive. Generally, the sapphire window may be C-plane sapphire, although other orientations may be implemented as well. The C-plane is typically more available commercially and provides a good level of hardness.

One embodiment may take the form of a method that includes cutting through the sapphire using a laser. That is, the laser may have sufficient power to cut through the sapphire. To this point, commercially available lasers have not been able to perform this task with sufficient efficiency, primarily due to insufficient power. Specifically, the laser may be capable of operating at or near 50 Watts, although some embodiments may utilize higher or lower power lasers. Additionally, in some embodiments, the laser power may be dynamically adjusted to suit a particular purpose. Moreover, the laser may operate in or near the IR band of the electromagnetic spectrum and may be capable of pulsing in or near the pico second time frame. In other embodiments, the laser may operate with pulse lengths from the millisecond to the femtosecond range. The use of the laser provides for a faster cut over conventional techniques, such as CNC grinding used for glass but that still yields a sufficiently clean edge. Further, the laser is able to cut with precision so that a single wafer of sapphire may yield more similar sized windows than a glass wafer that is cut using conventional techniques.

The sapphire wafer may be pre-polished. The laser cutting does not disturb the polished surface. As such, decoration, such as ink patterning, may be applied to the sapphire wafer rather than after the windows are cut. Additionally, other treatments such as application of an oleophobic layer may be applied to the sapphire wafer prior to cutting. Performing such steps on the sapphire wafer rather than on discrete sapphire windows allows for faster and more efficient throughput as there are fewer processing steps and less handling of the windows.

In some embodiments, additional processing may be performed after the windows are cut, however. For example, the laser may be used to further shape the edges of the windows. In one embodiment, the edge of the windows may be given chamfers or may be blunted by the laser. Further, in some embodiments, an oleophobic layer or other layers may be applied after the windows have been cut.

Figure 1B:
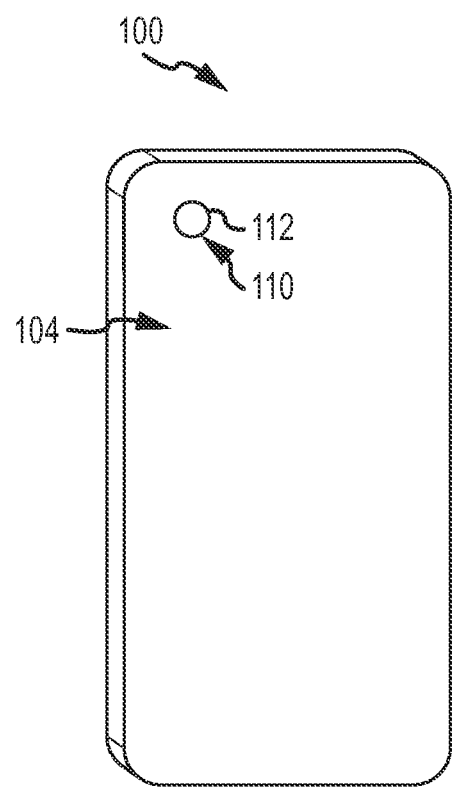
FIG. 1B illustrates a back side of the example electronic device of FIG. 1A.

Referring to FIGS. 1A and 1B, an example electronic device 100 is illustrated. In particular, FIG. 1A illustrates a front side 102 of the electronic device 100 and FIG. 1B illustrates a back side 104 of the electronic device. The front side 102 may include a display 106 with a sapphire cover window 108. In some embodiments, the window 108 may take the form of a sapphire sheet, a sapphire sheet with a glass laminate layer, or other suitable material, through which a visual output of the device 100 is output. Additionally, the window 108 may be configured to receive input from users via sensors, such as capacitive sensors. The back side 104 of the electronic device 100 includes a camera 110 with a cover window 112. As with the window 108 of the front side 102, the cover window 112 may take any suitable form, such sapphire.

The illustrated electronic device 100 is a smart phone, such as the iPhone® made by Apple, Inc. It should be appreciated, however, that the present techniques may be implemented in the manufacture of a variety of different devices including but not limited to media players, tablet computers, cameras, cell phones, and so forth. As such, the present discussion and accompanying drawings should be understood as non-limiting examples. Moreover, although the present examples discuss sapphire, it should be appreciated that it may be possible to implement the present techniques with materials other than sapphire. Further, the term "window" as used herein should not be limited to applications where visible light traverses the sapphire. Indeed, window may refer to transparency of visible and non-visible electromagnetic radiation, such as radio frequency (RF) transmittance for antennas.

Figure 2:
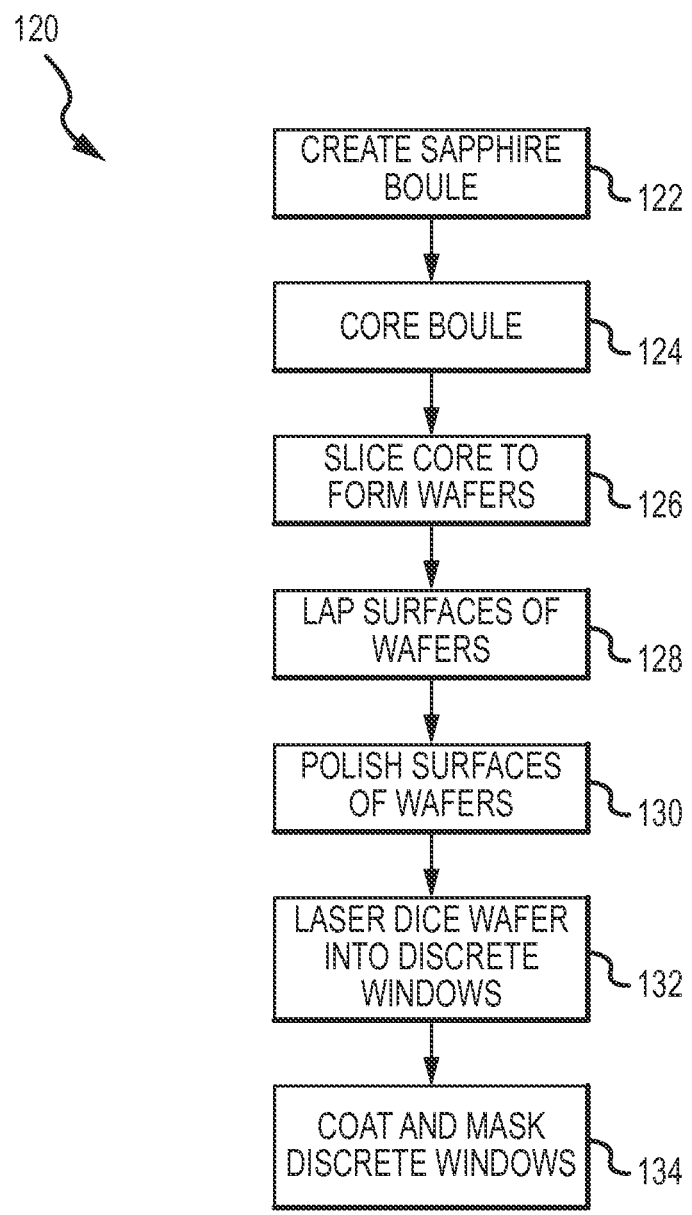
FIG. 2 is a flowchart illustrating an example method for processing sapphire windows for use in the electronic device of FIGS. 1A and 1B.

The processing steps for creation of windows for use in the device 100 may be streamlined to achieve efficiencies that may reduce the cost of using sapphire as the window material. In particular, FIG. 2 is a flowchart illustrating an example method 120 for processing sapphire windows. Initially, sapphire boule is grown and the boule is cored (Blocks 122 and 124). The boule may be grown in accordance with contemporary sapphire growth techniques. The coring of the sapphire boule yields an elongated sapphire member. The sapphire core is sliced into wafers (Block 126). The wafers are lapped (Block 128) and polished (Block 130) before being diced by a laser (Block 132) to form discrete windows. The windows may then individually be coated and masked (Block 134). The coating and masking may include, for example, providing an oleophobic coating and an ink mask.

Referring again to step 122, conventional sapphire growth processes may include, for example, an edge defined film-fed growth process, a Kryopolous method, a vertically directed crystallization method, or other suitable method. The boule may be shaped into a core that may generally take the form of a cylindrical core by trimming the boule in any suitable manner before slicing the core to form the wafers. The shaping and slicing of the core may be performed by a high power laser in some embodiments, while in other embodiments, conventional tools may be used to shape and/or slice the core into wafers. Utilizing the laser to cut the core into wafers may provide faster processing time, or more cost effective process than when conventional cutting tools are used. The wafers may be lapped and polished using two-sided or single-sided lapping and polishing techniques. That is, one or both sides of the wafer are lapped and polished individually or simultaneously to provide opposing smooth surfaces.

Cutting the lapped and polished sapphire wafer with the laser results in a higher yield of windows than conventional cutting techniques. This is due in part to the high level of precision of the laser and its ability to make fine cuts. Additionally, the laser cutting does not damage or mar the surfaces of the wafer or the windows, thus enabling the pre-dicing polishing to be the only polishing step. In conventional processing, a polishing step is commonly performed after dicing.

The subsequent treatment of the individual windows may include the application of an oleophobic layer to a first side of the window and an ink mask on the second side of the window. The first side of the window may generally be the side of the window that will be exposed to and accessible to a user of the device 100. The second side, therefore, is generally the non-exposed side and inaccessible to the user, although, in some embodiments, the opposite may be feasible and desirable using the laser cutting methods. The ink mask may be a dark or black ink that surrounds, or provides boundaries to the windows. In some embodiments, additional treatments may be applied to the window such as an IR coating for the cover window 112.

Figure 3A:
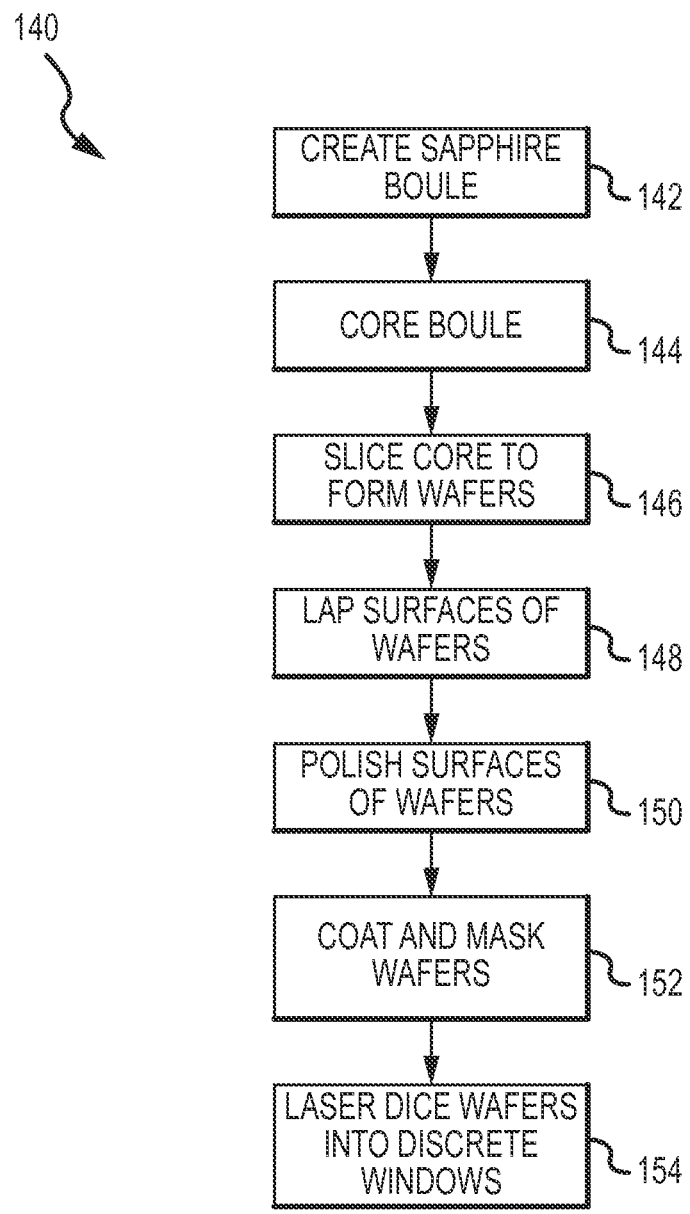
FIG. 3A is a flowchart illustrating another example method for processing sapphire windows for use in the electronic device of FIGS. 1A and 1B.

FIG. 3A is flowchart illustrating another method 140 for processing the sapphire to create windows. As with the method of FIG. 2, a sapphire boule may be grown and a core may be cut from the boule (Block 142 and 144). The core may be sliced into wafers (Block 146) which may be lapped and polished as above (Block 148 and 150). However, in contrast to the method of FIG. 2, the wafer may be decorated and treated prior to dicing the wafer (Block 152). The wafer may then be diced using the laser (Block 154).

As may be appreciated, the decoration and treatment at the wafer level may result in significant processing cost and time savings relative to the method illustrated in FIG. 2. In particular, all of the windows may be decorated and treated while still part of the wafer. The decoration therefore is applied to all the windows at once. There is no need to individually collect, orient and secure each window for discrete treatment and/or decoration. When dicing the windows from the wafer, the laser may be configured to cut through the decoration in some embodiments. The decoration will sustain little or no damage due to being cut through by the laser. In other embodiments, the decoration may be applied to the wafer such that it will not be cut by the laser.

Figure 3B:
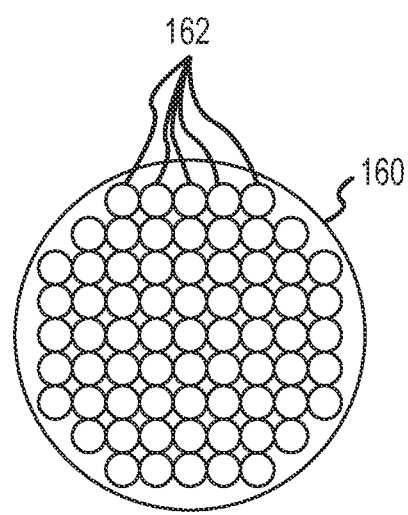
FIG. 3B illustrates a sapphire wafer with an ink mask defining discrete windows.
Figure 3C:
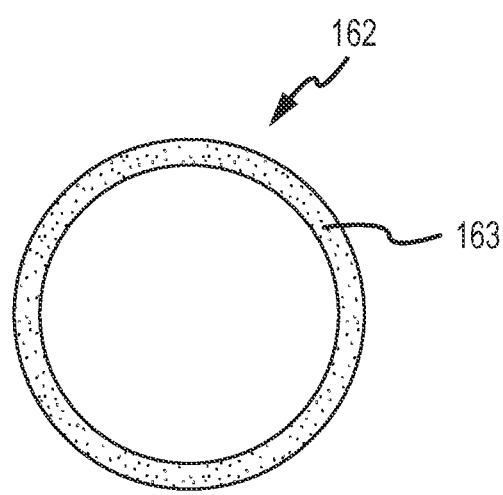
FIG. 3C is an enlarged view of a discrete window cut from the sapphire wafer showing the ink mask.
Figure 3D:
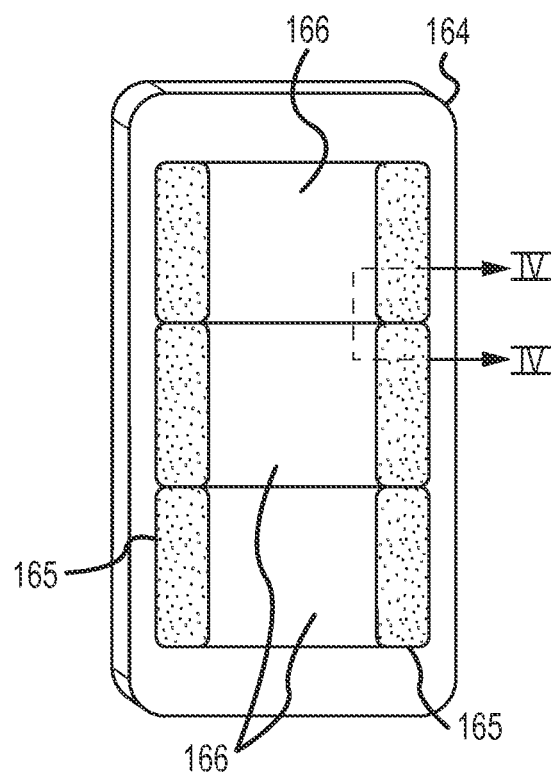
FIG. 3D illustrates another sapphire wafer with an ink mask defining discrete cover windows.

FIG. 3B illustrates an example sapphire wafer 160. The sapphire wafer 160 has been masked with an ink mask that defines discrete windows 162 that may be cut from the wafer 160 and used in the device 100, for example as camera windows. Generally, the windows 162 may be densely packed on the wafer 160. That is, the distance between the respective windows 162 may be small. This small distance is limited only by the width of cut achievable by a laser used to dice the wafer 160 into discrete windows. FIG. 3C is an enlarged view of a discrete window 162 cut from the wafer 160 and showing an ink mask 163. FIG. 3D illustrates another wafer 164 which has been masked to define discrete cover windows 166 which may be cut from the wafer 164. Generally, the ink mask 165 may be limited to periphery edges of the cover windows 166, although it should be appreciated that in some embodiments this may not be the case. As with the wafer 160 of FIG. 3B, the cover windows 166 are densely packed.

Figure 4A:
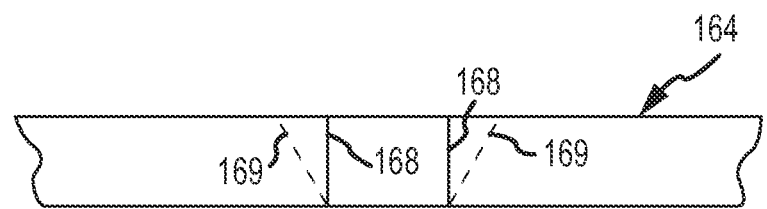
FIG. 4A is a cross-sectional view taken along line IV-IV in FIG. 3D showing cuts made to the sapphire wafer to create the discrete cover windows.

FIG. 4A is a cross-sectional view taken along line IV-IV of the wafer 164 of FIG. 3C. Generally, the wafer 164 may be cut by a laser in using one of a variety of techniques to provide a desired edge for a particular use. In particular, for example, the wafer 164 may be cut to provide vertical edges 168 for a cover window. Alternatively, the wafer 164 may be cut to have angled edges 169 for use as a camera window. To achieve the vertical or straight edges 168, the laser ablation process may utilize a laser of a different pulse length. In contrast, to achieve the angled edges 169, the laser may be pulsed and may move in a repetitive motion to remove material a layer at a time as it proceed to cut through the wafer.

Figure 4B:
FIG. 4B is a side view of a cover window having a vertical edge.
Figure 4C:
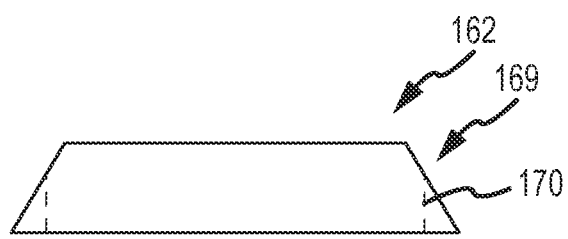
FIG. 4C is a side view of a window having an angled edge.
Figure 4D:
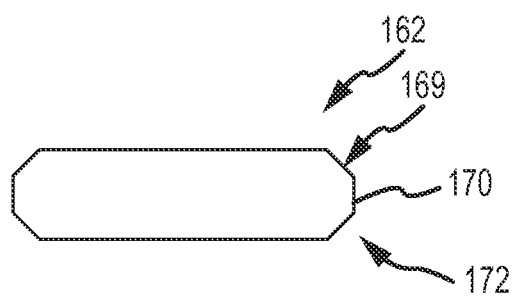
FIG. 4D illustrates a window having a fully chamfered edge.

FIG. 4B illustrates a side view of the cover window 166 after it has been cut. As may be appreciated, the corner edges may be further processed to provide a rounded or chamfered corner. FIG. 4C illustrates a camera window 162 after it has been cut from the wafer. The angled edge 169 may be blunted by cutting vertically along the dashed line 170. The blunting may be performed be the laser or other conventional machining tool. The edge 169 may further be cut to provide a fully chamfered edge 162 as shown in FIG. 4D. It should be appreciated that the laser cutting allows vertical sidewalls to be created as well. Specifically, the vertical sidewall may result from an initial cut of a window from a wafer without further processing, for example.

Figure 5A:
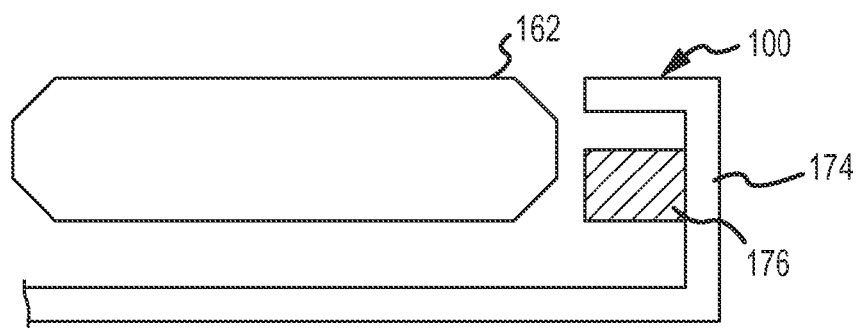
FIG. 5A is a cross-sectional view taken along line V-V in FIG. 1A illustrating a gasket to secure a window within the device housing.
Figure 5B:
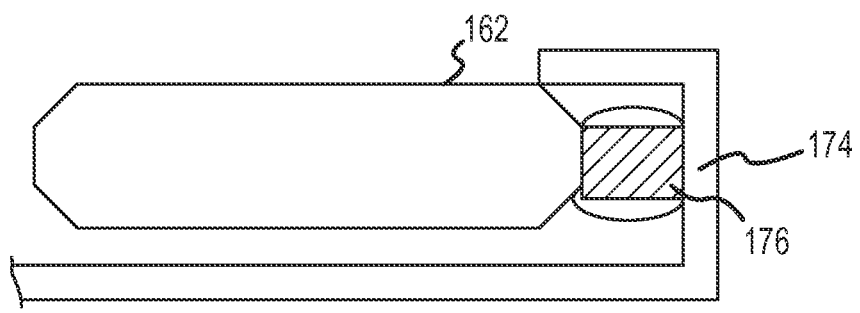
FIG. 5B is a cross-sectional view taken along line V-V in FIG. 1A illustrating the window compressing the gasket when installed.
Figure 5C:
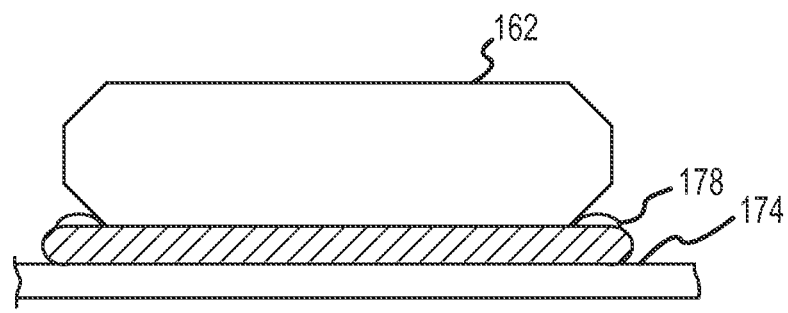
FIG. 5C is a cross-sectional view taken along line V-V in FIG. 1A illustrating a heat activated film for securing the window within the device housing.

The windows 162, 166 may be secured within a housing 174 of the device 100 in any suitable manner. FIG. 5A illustrates the window 162 being secured within the housing 174 of the device 100 using a rubber gasket 176. Specifically, the window 162 is pushed into the housing 174 and compresses the gasket 176, as shown in FIG. 5B. Thus, the rubber gasket 176 secures the window 162 as well as provides a cushion for the window. Further, the gasket 176 may help to center the window 162 within an aperture or within the housing. In other embodiments, a heat activated film or pressure sensitive adhesive may be used to secure the window. FIG. 5C illustrates the window 162 pressed into the film 178. The heat activated film 178 adheres to both the housing 174 and the window 162 to secure the window 162 within or to the housing 174.

Figure 6:
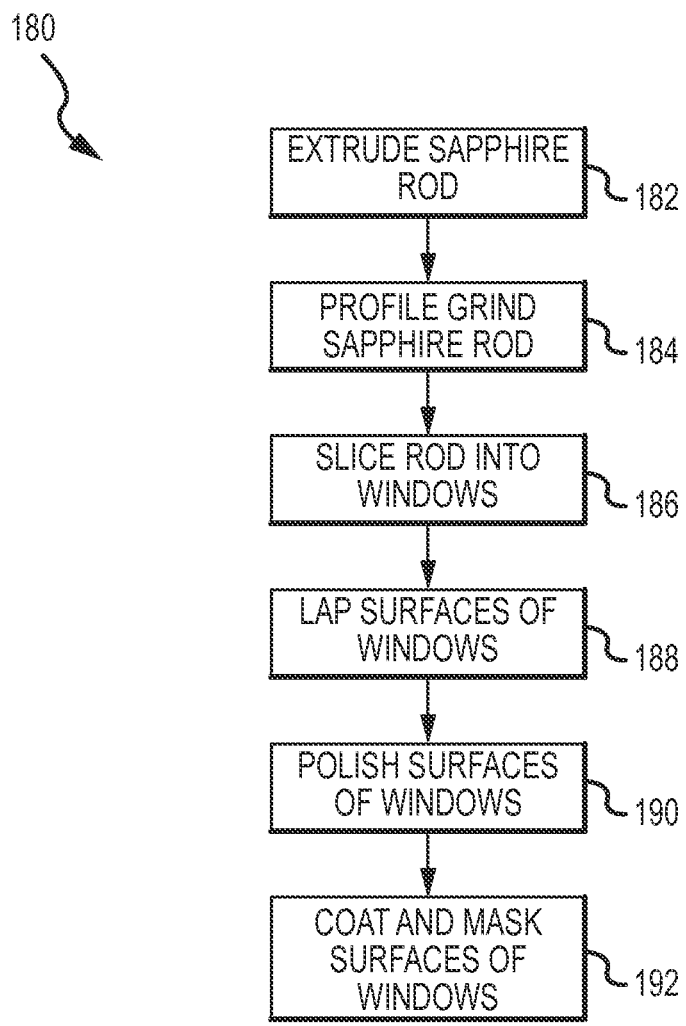
FIG. 6 is a flow chart illustrating yet another example method for processing sapphire windows for use in the electronic device of FIGS. 1A and 1B.

FIG. 6 is a flowchart illustrating yet another method 180 for processing sapphire to create windows. In the method 180, an EFG process is implemented to form the sapphire. Specifically, the sapphire is grown in a near net shape crystal rod (Block 182). The rod may then be profile grinded to the desired size and shape (Block 184). The rod is sliced to form the windows (Block 186). The windows are lapped (Block 188) and polished (Block 190) before coating and masking the windows (Block 192). The coating and masking steps may include those previously discussed such as providing an IR coating, an oleophobic coating, and an ink decoration. As the sapphire rod may be extruded to approximate the desired shape of the window, several steps may be saved over other methods. Specifically, there is no coring and no dicing of wafers. As such, processing costs and time may be reduced.

The foregoing describes some example embodiments of sapphire windows and processing of sapphire windows. Although the foregoing discussion has presented specific embodiments, persons skilled in the art will recognize that changes may be made in form and detail without departing from the spirit and scope of the embodiments. In particular, certain processes and/or treatments described above with respect one embodiment may be implemented with other embodiments. Accordingly, the specific embodiments described herein should be understood as examples and not limiting the scope thereof.

The invention claimed is:

1. A method of manufacturing sapphire windows comprising:
    obtaining a polished sapphire wafer comprising material for forming a set of discrete windows;
    applying decoration to the polished sapphire wafer; and
    after applying decoration, cutting the polished sapphire wafer into the set of discrete windows.

2. The method of claim 1, wherein applying decoration to the sapphire wafer comprises printing ink onto a first side of the polished sapphire wafer.

3. The method of claim 2, further comprising applying an oleophobic coating to a second side of the polished sapphire wafer.

4. The method of claim 2, wherein the ink defines a boundary for each of the discrete windows.

5. The method of claim 2, wherein the ink is cut during the cutting step.

6. The method of claim 2, wherein the ink is not cut during the cutting step.

7. The method of claim 1, wherein the cutting step comprises laser ablation of the sapphire wafer.

8. The method of claim 7, wherein the laser ablation comprises pulsing a laser.

9. The method of claim 7, wherein the sapphire wafer is cut to provide an angled edge to each discrete window of the set of discrete windows.

10. The method of claim 1, further comprising applying an oleophobic coating to the wafer.

11. The method of claim 1, further comprising applying an IR coating to the wafer.

12. The method of claim 1, further comprising blunting at least one edge of each discrete window of the set of discrete windows.

13. The method of claim 1, further comprising:
    growing a sapphire boule;
    coring the sapphire boule to form a sapphire core;
    slicing the sapphire core into wafers;
    lapping the sapphire wafers;
    polishing the sapphire wafers to provide the polished sapphire wafers.

14. The method of claim 13, wherein slicing the sapphire core into wafer comprises using a laser to slice the sapphire core.

15. A method of manufacturing sapphire windows comprising:
    growing a sapphire boule;
    coring the sapphire boule to form a sapphire core;
    slicing the sapphire core into sapphire wafers, each sapphire wafer comprising material for forming a set of discrete windows;
    lapping the sapphire wafers;
    polishing the sapphire wafers to provide polished sapphire wafers;
    cutting the polished sapphire wafers into the set of discrete windows using a laser; and
    applying an ink mask to each discrete window of the set of discrete windows.

16. The method of claim 15, further comprising operating the laser in a pulsed manner to create an angled edge.

17. The method of claim 15, further comprising operating the laser in a manner to form a vertical edge.

18. The method of claim 15 further comprising applying at least one of:
- an IR coating; and
- an oleophobic coating.

19. A method of manufacturing sapphire windows comprising:
- extruding a sapphire member comprising material for forming a set of discrete windows;
- applying decoration to the sapphire member;
- grinding an edge of the sapphire member;
- subsequent to the applying of the decoration to the sapphire member, cutting the sapphire member using a laser to form the set of discrete windows; and
- polishing each discrete window of the set of discrete windows.

20. The method of claim 19 further comprising applying to the polished windows at least one of:
- an ink mask;
- an oleophobic coating; or
- an IR coating.

21. The method of claim 19, wherein the extruding step results in an elongate sapphire member having an axial profile approximating a size of the resulting windows.

* * * * *